(12) United States Patent
Zhang et al.

(10) Patent No.: US 9,756,092 B2
(45) Date of Patent: Sep. 5, 2017

(54) DISTRIBUTION AND SYNCHRONIZATION OF A SOCIAL MEDIA ENVIRONMENT

(71) Applicant: Verizon and Redbox Digital Environment Services, LLC., Basking Ridge, NJ (US)

(72) Inventors: Gong Zhang, Waltham, MA (US); Gaurav D. Mehta, Brookline, MA (US); Ishan Awasthi, Wilmington, MA (US); Jian Huang, Sudbury, MA (US); Jianxiu Hao, Lexington, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 597 days.

(21) Appl. No.: 14/057,740

(22) Filed: Oct. 18, 2013

(65) Prior Publication Data

US 2015/0113058 A1    Apr. 23, 2015

(51) Int. Cl.
*G06F 15/16* (2006.01)
*H04L 29/06* (2006.01)
*G06Q 50/00* (2012.01)

(52) U.S. Cl.
CPC .......... *H04L 65/403* (2013.01); *G06Q 50/01* (2013.01); *H04L 65/4084* (2013.01)

(58) Field of Classification Search
CPC ......... H04N 21/47202; H04N 21/6587; H04N 21/44222; H04N 21/4314; H04N 21/4307; H04N 21/4788; H04N 21/4312; H04N 7/17318; H04N 21/4751; H04L 67/22; H04L 29/06; H04L 65/403; H04L 65/4084; G06Q 50/01
See application file for complete search history.

(56) References Cited

U.S. PATENT DOCUMENTS 8,817,065 B1 * 8/2014 Mo ..................... G06F 3/04842
348/14.08
9,215,286 B1 * 12/2015 Schilit ..................... H04L 67/22
2006/0174312 A1 * 8/2006 Ducheneaut ............. H04N 5/76
725/135

(Continued)

OTHER PUBLICATIONS

Michael Arrington, "CBS Testing Social Viewing Room: Watch Stuff With Strangers and Talk During the Show", http://techcrunch.com/2008/10/02/cbs-testing-social-viewing-room-watch-stuff-with-strangers-and-talk-during-the-show/, Oct. 2, 2008, 9 pages.

*Primary Examiner* — Aftab N. Khan

(57) ABSTRACT

A system is configured to receive, from a first client device, a request to join a social media environment in which a second client device is participating; provide, to the first client device, information regarding media content associated with the social media environment and a number of playback positions from which to begin playback of the media content; receive, from the first client device, information selecting a playback position for the media content; provide, to the first client device, the media content via the social media environment beginning at the selected playback position; monitor interactions with the social media environment by the first client device and the second client device; detect a change of state for the social media environment; and provide, to the second client device, information associated with the change of state for the social media environment.

20 Claims, 17 Drawing Sheets

(56) References Cited

U.S. PATENT DOCUMENTS

| | | | | |
|---|---|---|---|---|
| 2007/0283380 A1* | 12/2007 | Aoki | H04N 7/10 | |
| | | | 725/32 | |
| 2008/0104127 A1* | 5/2008 | Billmaier | G06F 17/30029 | |
| 2009/0183220 A1* | 7/2009 | Amento | H04N 21/252 | |
| | | | 725/120 | |
| 2009/0249223 A1* | 10/2009 | Barsook | H04N 7/15 | |
| | | | 715/753 | |
| 2010/0017474 A1* | 1/2010 | Kandekar | H04N 7/17318 | |
| | | | 709/205 | |
| 2011/0239114 A1* | 9/2011 | Falkenburg | G06F 3/04883 | |
| | | | 715/702 | |
| 2013/0159858 A1* | 6/2013 | Joffray | H04N 21/4788 | |
| | | | 715/719 | |
| 2013/0290440 A1* | 10/2013 | Pratt | H04L 51/38 | |
| | | | 709/206 | |
| 2013/0312049 A1* | 11/2013 | Niyogi | H04N 21/25883 | |
| | | | 725/110 | |
| 2013/0339452 A1* | 12/2013 | Shaikh | H04L 51/32 | |
| | | | 709/205 | |
| 2014/0013196 A1* | 1/2014 | White | H04L 67/306 | |
| | | | 715/205 | |
| 2014/0122590 A1* | 5/2014 | Svendsen | H04N 21/252 | |
| | | | 709/204 | |
| 2014/0140679 A1* | 5/2014 | Khader | H04N 21/47202 | |
| | | | 386/239 | |
| 2014/0214920 A1* | 7/2014 | Wong | H04N 21/47202 | |
| | | | 709/203 | |

* cited by examiner

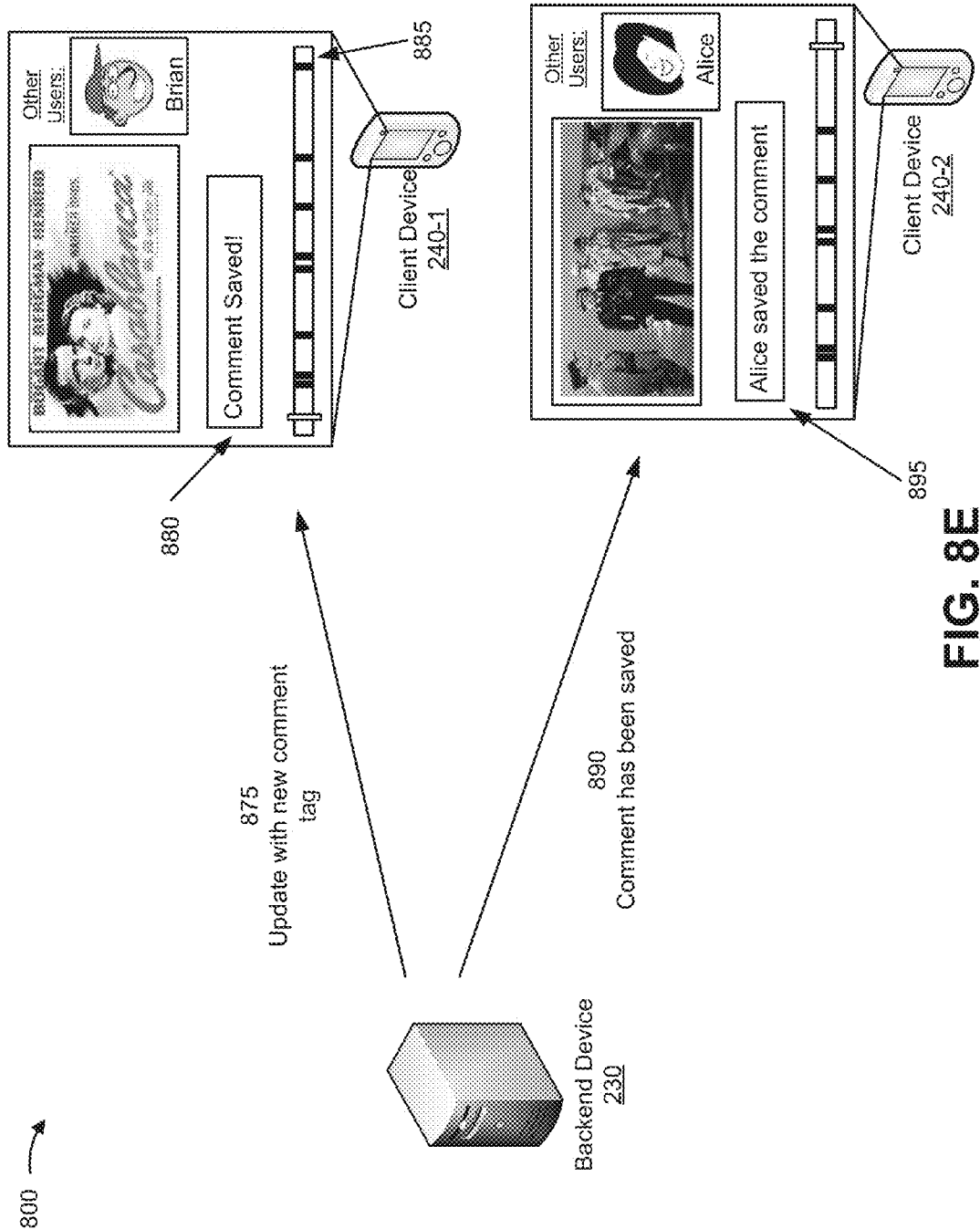

DISTRIBUTION AND SYNCHRONIZATION OF A SOCIAL MEDIA ENVIRONMENT

BACKGROUND

A user of a client device (e.g., a smart phone, a personal computer, etc.) may purchase content, such as video content (e.g., a movie, a television program, etc.), audio content (e.g., a song, an album, a podcast, etc.), or the like, from a content provider. The user may view the content via the client device.

BRIEF DESCRIPTION OF THE DRAWINGS

FIGS. 8A-8E are diagrams of another example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A user may purchase content, such as a movie, a television program, a radio program, a podcast, or the like, from a content provider. The user may view and/or listen to the content via a client device. The content provider may provide an application with which to view and/or listen to the content on the client device. For example, the content provider may provide a movie-viewing application. The application may collect information associated with viewing the content, such as viewership information, device information, or the like. However, providing content to a client device may limit the social aspects of viewership. Implementations described herein may allow a user to view content and communicate with other users via a social media watching environment.

Figure 1A:
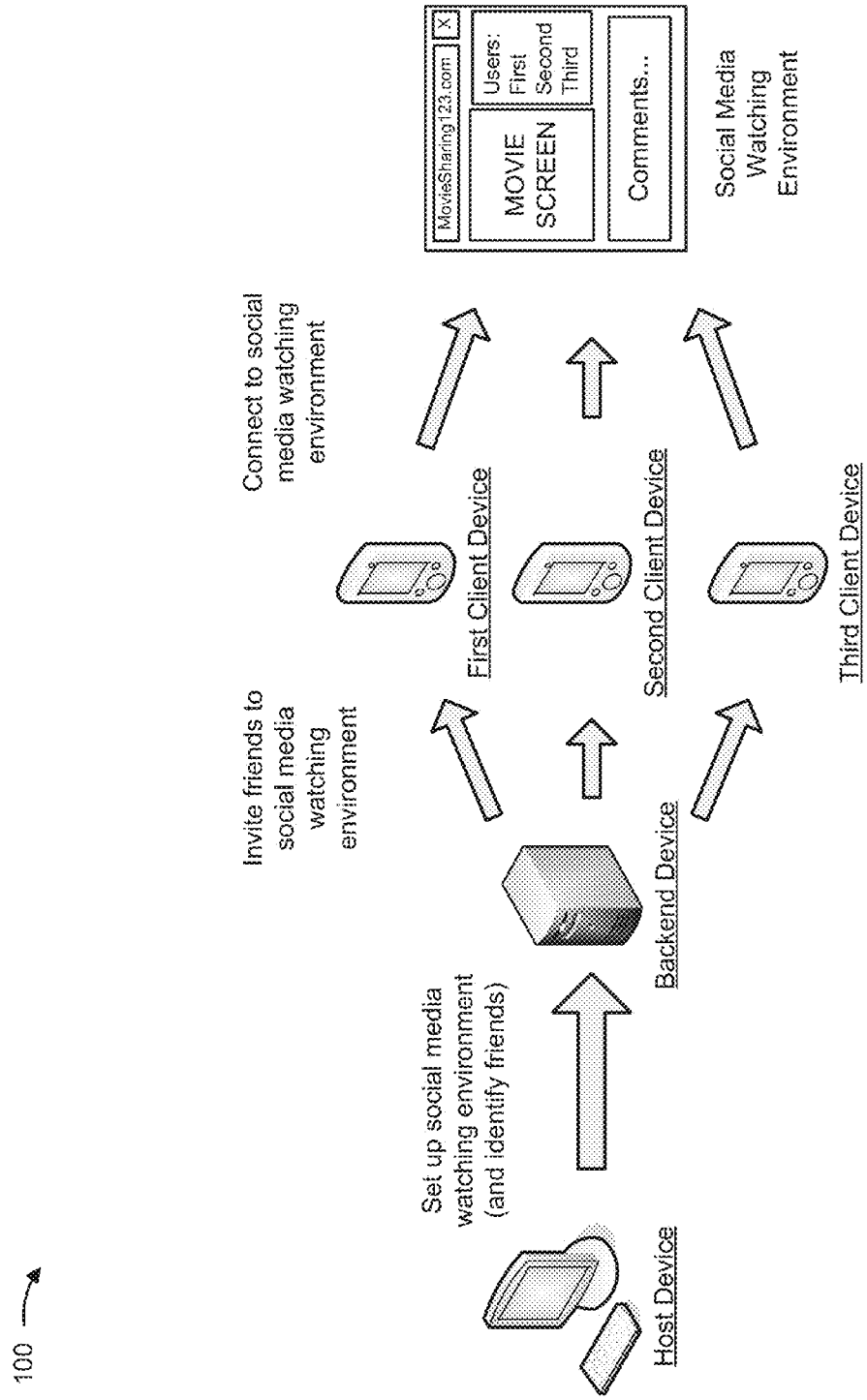
FIGS. 1A and 1B are diagrams of an overview of an example implementation described herein.
Figure 1B:
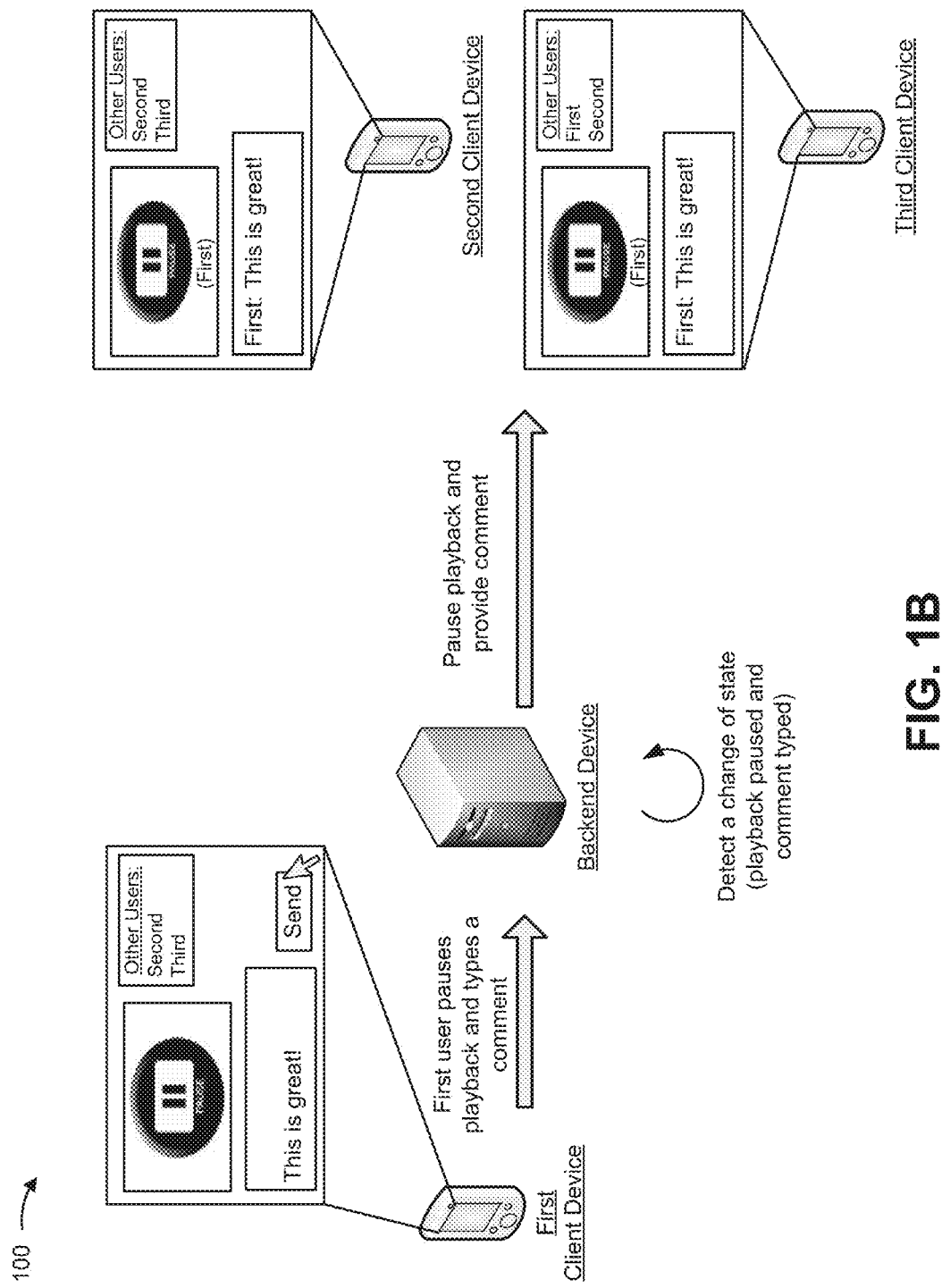

FIGS. 1A and 1B are diagrams of an overview of an example implementation 100 described herein. Example implementation 100 may include a host device, a backend device, and multiple client devices. As shown in FIG. 1A, a user of the host device may set up the social media watching environment. For example, the user may select content to be viewed, and may identify one or more friends (e.g., other users) who are to be provided the content via the social media watching environment. The host device may provide information associated with setting up the social media watching environment to the backend device, such as content information, user identification information, or the like. The host device may generate a link associated with the social media watching environment (e.g., a link embedded with information identifying the content, a group of users, an individual user within the group of users, or the like), and may provide an invitation for the social media watching environment to the multiple client devices. For example, the backend device may provide the invitation to the multiple client devices via an email, a social network service (e.g., a Facebook post, a Google Plus post, a tweet, etc.), or the like. The invitation may include information identifying the link, the content, the user associated with the host device, or the like. A user may connect to the social media watching environment by accessing the link, and may utilize the social media watching environment to view the content, interact with other users, or the like.

As shown in FIG. 1B, the backend device may monitor the social media watching environment for a change of state, and may provide information identifying the change of state to the client devices. For example, a user of the first client device may pause playback for the content, and may type a comment associated with the content (e.g., "This is great!"). The backend device may detect a change of state for the first client device (e.g., the paused playback, the typed comment, etc.), and may provide information associated with the change of state to the other client devices (e.g., the second client device and the third client device) that are utilizing the social media watching environment. For example, the backend device may pause playback for the other client devices, and may provide the comment to the other client devices. The other client devices may display, via the social media watching environment, information identifying the user who has paused playback, the comment typed by the user, or the like. In another example, content may be provided by the backend device, via the social media watching environment, to different client devices at different playback positions. In this case, the backend device may associate the change of state with a timestamp (e.g., the timestamp associated with playback on the client device for which the change of state has been detected), and may delay providing information associated with the change of state to the other client devices until playback progress for the other client devices is determined to have reached the timestamp.

While systems and methods are described herein in terms of video and users viewing the video, the systems and methods may also be implemented in terms of audio and users listening to the audio. For example, a backend device may provide a program, such as a podcast, an audiobook, a concert performance, or the like, to a client device via a social media listening environment, and a client device may provide the program for listening by a user.

Figure 2:
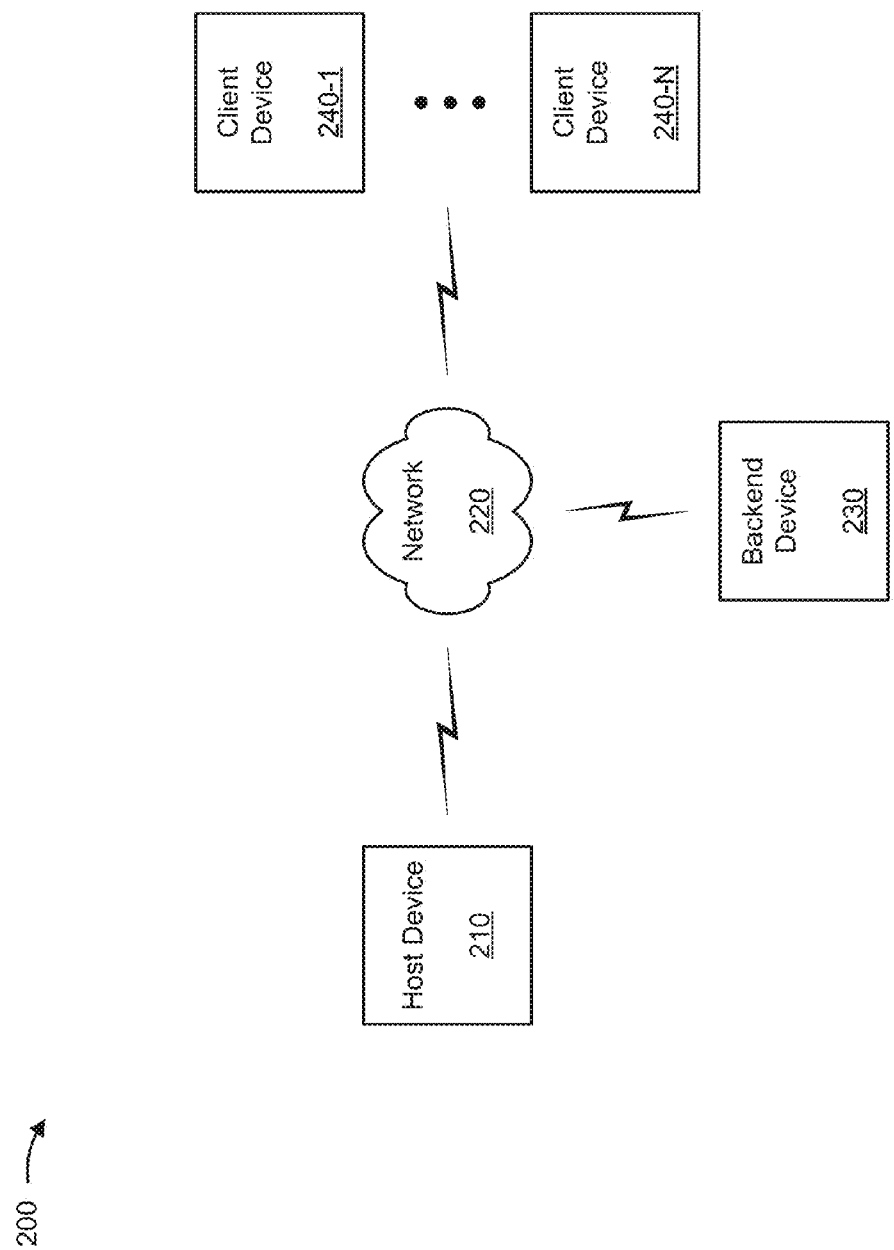
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include host device 210, network 220, backend device 230, and client devices 240-1 to 240-N (N≥1) (hereinafter referred to collectively as "client devices 240," and individually as "client device 240"). Devices of environment 200 may interconnect via wired connections, wireless connections, or a combination of wired and wireless connections.

Host device 210 may include one or more devices capable of receiving, generating, processing, storing, and/or providing information associated configuring a social media watching environment. For example, host device 210 may include a mobile phone (e.g., a smart phone), a radiotelephone, a person communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a set-top box, or a similar type of device. In some implementations, host device 210 may select content from a content provider to be provided via the social media watching environment. In some implementations, host device 210 may provide information identifying one or more client devices 240 to receive invitations to the social media watching environment. Additionally, or alternatively, host device 210 may be capable of accessing a social networking service (e.g., via network 220) to invite one or more users associated with one or more client devices 240 to the social media watching environment.

Network 220 may include one or more wired and/or wireless networks. For example, network 220 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, backend device 230 may provide a social media watching environment (e.g., that provides content, such as audio content, video content, or the like) to one or more client devices 240 via network 220.

Backend device 230 may include one or more devices capable of receiving, generating, processing, storing, monitoring, and/or providing information associated with a social media watching environment. For example, backend device 230 may include a server capable of hosting the social media watching environment, and/or generating a link to the social media watching environment. In some implementations, backend device 230 may be associated with a content provider, such as a movie content provider, a television content provider, a radio content provider, or the like. In some implementations, backend device 230 may monitor the social media watching environment to detect a change of state associated with the social media watching environment, such as a playback adjustment (e.g., a user activating a pause function, a play function, a stop function, a skip function, etc., via client device 240), a social interaction (e.g., the user sending a comment, an image, etc.), or the like.

Client device 240 may include one or more devices capable of receiving, generating, processing, storing, providing, and/or interacting with a social media watching environment. For example, client device 240 may include a mobile phone (e.g., a smart phone), a radiotelephone, a person communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a video game console, a set-top box, or a similar type of device. In some implementations, client device 240 may be provided a social media watching environment by backend device 230 (e.g., via network 220). In some implementations, client device 240 may allow a user to interact with the social media watching environment, such as by posting a comment, adjusting a playback configuration, or the like.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while host device 210 and client device 240 are shown as separate devices, host device 210 and client device 240 may be implemented in a single device. Additionally, one or more of the devices of environment 200 may perform one or more functions described as being performed by another one or more devices of environment 200.

Figure 3:
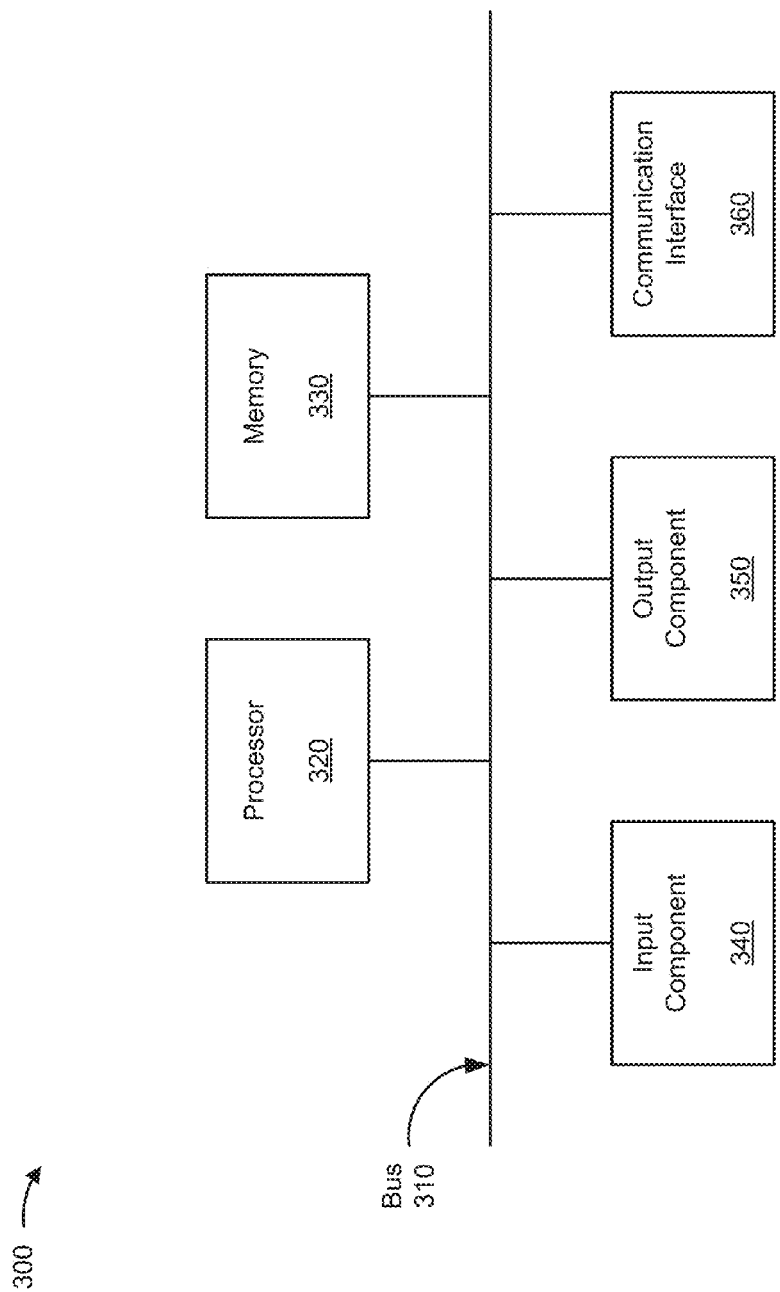
FIG. 3 is a diagram of example components of one or more devices of FIG. 2.

FIG. 3 is a diagram of example components of a device 300. Device 300 may correspond to host device 210, backend device 230, and/or client device 240. In some implementations, each of host device 210, backend device 230, and/or client device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
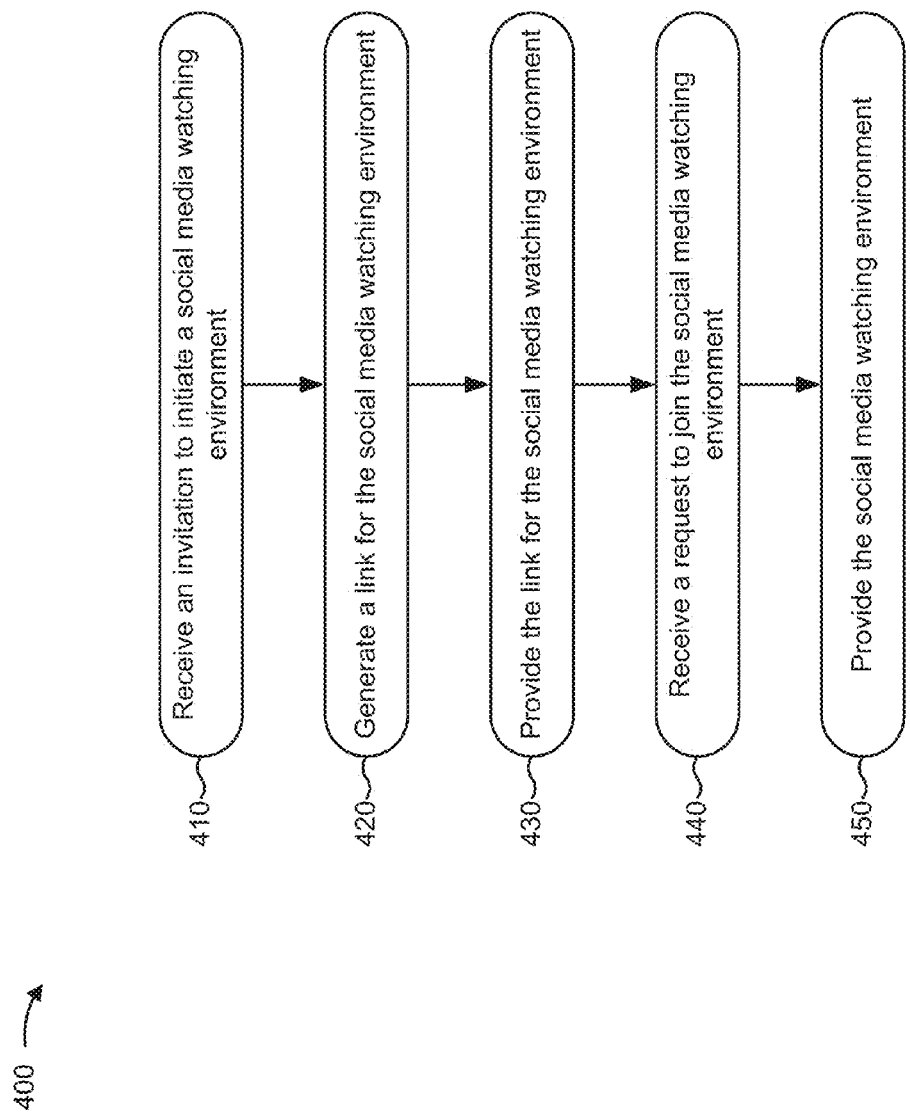
FIG. 4 is a flow chart of an example process for providing a social media watching environment.

FIG. 4 is a flow chart of an example process for providing a social media watching environment. In some implementations, one or more process blocks of FIG. 4 may be performed by backend device 230. Additionally, or alternatively, one or more process blocks of FIG. 4 may be performed by another device or a group of devices separate from or including backend device 230, such as host device 210 and/or client device 240.

As shown in FIG. 4, process 400 may include receiving an invitation to initiate a social media watching environment (block 410). For example, backend device 230 may receive the invitation to initiate the social media watching environment from host device 210. A social media watching environment may refer to platform with which to provide content (e.g., media content, such as a movie, a television program, a radio program, a song, a podcast, an audiobook, a concert performance, or the like), social interaction (e.g., chat capability, commenting capability, etc.), playback control (e.g., pausing playback, choosing content for playback, etc.), or the like. For example, backend device 230 may provide, to multiple client devices 240, movie playback and inter-device chat functionality via the social media watching environment.

The invitation to initiate the social media watching environment may include information identifying host device 210, in some implementations. For example, backend device 230 may receive information identifying host device 210, such as a device identification, a user identification, login information, or the like. Backend device 230 may determine whether host device 210 is authorized to initiate the social media watching environment based on the information identifying host device 210.

The invitation to initiate the social media watching environment may include information identifying content to be provided, in some implementations. For example, a user of host device 210 may select content that is to be provided via the social media watching environment. Content may refer to media that is to be provided via the social media watching environment, such as video content (e.g., a movie, a television program, a streaming-web program, etc.), audio content (e.g., a radio program, a song, a podcast, an album, etc.), or the like. In some implementations, the content that is to be provided may be selected from a content provider associated with backend device 230. For example, backend device 230 may identify a set of movies that may be selected for viewing, and host device 210 may select a movie from the set of movies.

The invitation to initiate the social media watching environment may include information identifying a user for whom the social media watching environment is to be provided by backend device 230, in some implementations. For example, host device 210 may provide user identification information to backend device 230 (e.g., an email address, a social network service name, a username, a handle, etc.) for one or more users associated with one or more client devices 240. Additionally, or alternatively, host device 210 may provide information identifying client device 240 (e.g., a network address, a device identifier, etc.).

As further shown in FIG. 4, process 400 may include generating a link for the social media watching environment (block 420). For example, backend device 230 may generate the link for the social media watching environment. In some implementations, backend device 230 may generate a single link for multiple client devices 240 to which the link is to be provided. Additionally, or alternatively, backend device 230 may generate a first link for a first client device 240, and may generate a second link for a second client device 240.

In some implementations, backend device 230 may generate the link in a deep-link format. A deep-link may refer to a link embedded with descriptive information. For example, backend device 230 may generate the link based on a content identifier, such as a movie identifier, a song identifier, or the like. Additionally, or alternatively, backend device 230 may generate the link based on a group identifier (e.g., an identifier associated with a set of client devices 240 for which the social media watching environment is to be provided). Additionally, or alternatively, backend device 230 may generate the link based on a user identifier, such as an email address, a username, a device identifier, or the like. Additionally, or alternatively, backend device 230 may generate the link based on authentication information (e.g., information indicating that client device 240 is authorized to be provided the content via the social media watching environment). Additionally, or alternatively, backend device 230 may generate anchor text associated with the link that identifies content, a group of users, or the like.

As further shown in FIG. 4, process 400 may include providing the link for the social media watching environment (block 430). For example, backend device 230 may provide the link for the social media watching environment to client device 240. In some implementations, providing the link may include providing the link to a particular user for access via client device 240. For example, backend device 230 may provide the link via an email, a social network service posting, or the like. Additionally, or alternatively, backend device 230 may provide the link to a particular client device 240. For example, backend device 230 may identify, based on information from host device 210, the particular client device 240, and may provide the link for utilization by a user of the particular client device 240. Additionally, or alternatively, backend device 230 may provide the link for access via a social network service. For example, backend device 230 may identify a social network service (e.g., Google Plus, Facebook, Twitter, Tumblr, etc.), and may post the link to a particular section of the social network service. In this case, one or more client devices 240 authorized for the particular section of the social network service may utilize the link.

As further shown in FIG. 4, process 400 may include receiving a request to join the social media watching environment (block 440). For example, backend device 230 may receive the request to join the social media watching environment from client device 240 based on the user of client device 240 selecting the link. In some implementations, backend device 230 may identify the particular social media watching environment of a set of social media watching environments when receiving the request to join the social media watching environment. For example, backend device 230 may determine an identifier, such as a content identifier, a group identifier, a user identifier, etc., based on the link selected by the user of client device 240. In this case, backend device 230 may identify the particular social media watching environment, of the set of social media watching environments, based on the identifier.

As further shown in FIG. 4, process 400 may include providing the social media watching environment (block 450). For example, backend device 230 may provide the social media watching environment to client device 240. In some implementations, backend device 230 may authenticate client device 240 when providing the social media watching environment. For example, backend device 230 may confirm that a user of client device 240 is authorized to view the content being provided via the social media watching environment (e.g., via a password authentication, a device authentication, or the like) before providing the social media watching environment to client device 240.

Backend device 230 may configure client device 240 to access the social media watching environment when providing the social media watching environment, in some implementations. For example, backend device 230 may provide information associated with accessing the social media watching environment to client device 240 (e.g., configuration information, application installation information, video-decoding information, audio-decoding information, downloading information, etc.).

Backend device 230 may determine a playback setting for the content when providing the social media watching environment, in some implementations. For example, backend device 230 may indicate that the content is to be played. Additionally, or alternatively, backend device 230 may indicate that the content is not to be played until a threshold quantity of other client devices 240 join the social media watching environment.

In some implementations, backend device 230 may provide synchronized content via the social media watching environment to multiple client devices 240. For example, backend device 230 may determine a playback position for the content and may provide the content at the playback position to the multiple client devices 240 via the social media watching environment. Additionally, or alternatively, backend device 230 may provide asynchronous content viewing via the social media watching environment. For example, backend device 230 may provide the content at a first playback position to a first client device 240, and may provide the content at a second playback position to a second client device 240 via the social media watching environment.

Backend device 230 may provide information indicating that client device 240 has been provided the social media watching environment, in some implementations. For example, backend device 230 may provide a user identification, a device identification, etc. associated with client device 240 to one or more other client devices 240 that are being provided the social media watching environment. Additionally, or alternatively, backend device 230 may provide information, that may be used for analytics, indicating that the social media watching environment is being provided to client device 240. For example, backend device 230 may generate billing information, provide viewership information, provide content identification information, provide device information, or the like, for storage and/or processing.

In this way, a backend device may generate a link associated with a particular social media watching environment, and may provide the link to a client device. Furthermore, the backend device may receive a request to join the particular social media watching environment from the client device based on utilization of the link, and may provide the social media watching environment thereupon.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
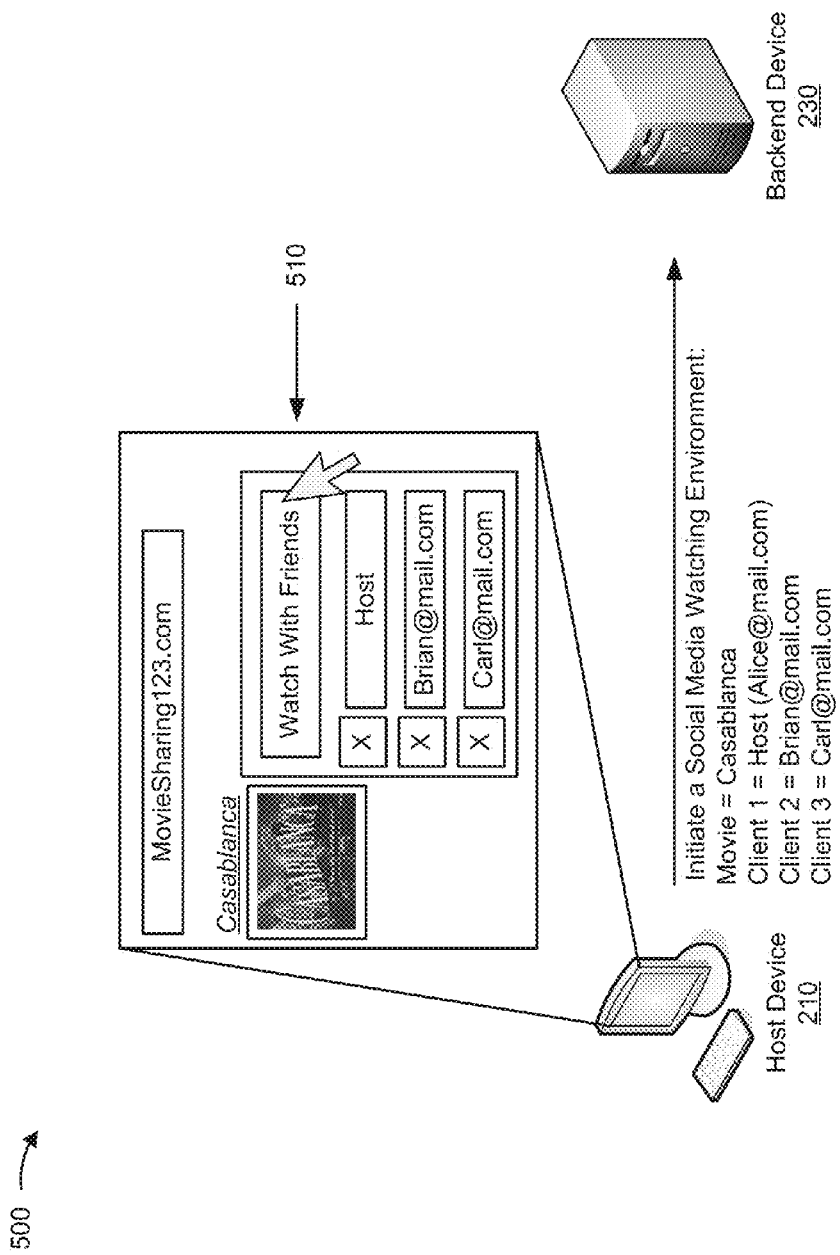
FIGS. 5A-5D are diagrams of an example implementation relating to the example process shown in FIG. 4.

FIGS. 5A-5D are diagrams of an example implementation 500 relating to process 400 shown in FIG. 4. As shown in FIG. 5A, example implementation 500 may include host device 210 and backend device 230. Host device 210 accesses a web page with which a user of host device 210 (e.g., "Alice") selects a movie (e.g., "Casablanca"), and identifies two other users (e.g., "Brian" and "Carl") with whom to watch the movie (e.g., identified by the email address "Brian@mail.com" and "Carl@mail.com"). As shown by reference number 510, based on user interaction with a button, host device 210 invites backend device 230 to initiate a social media watching environment. The invitation to backend device 230 identifies the content (e.g., the movie, Casablanca), the user associated with host device 210 (e.g., "Client 1=Host (Alice@mail.com)"), and the two other users.

Figure 5B:
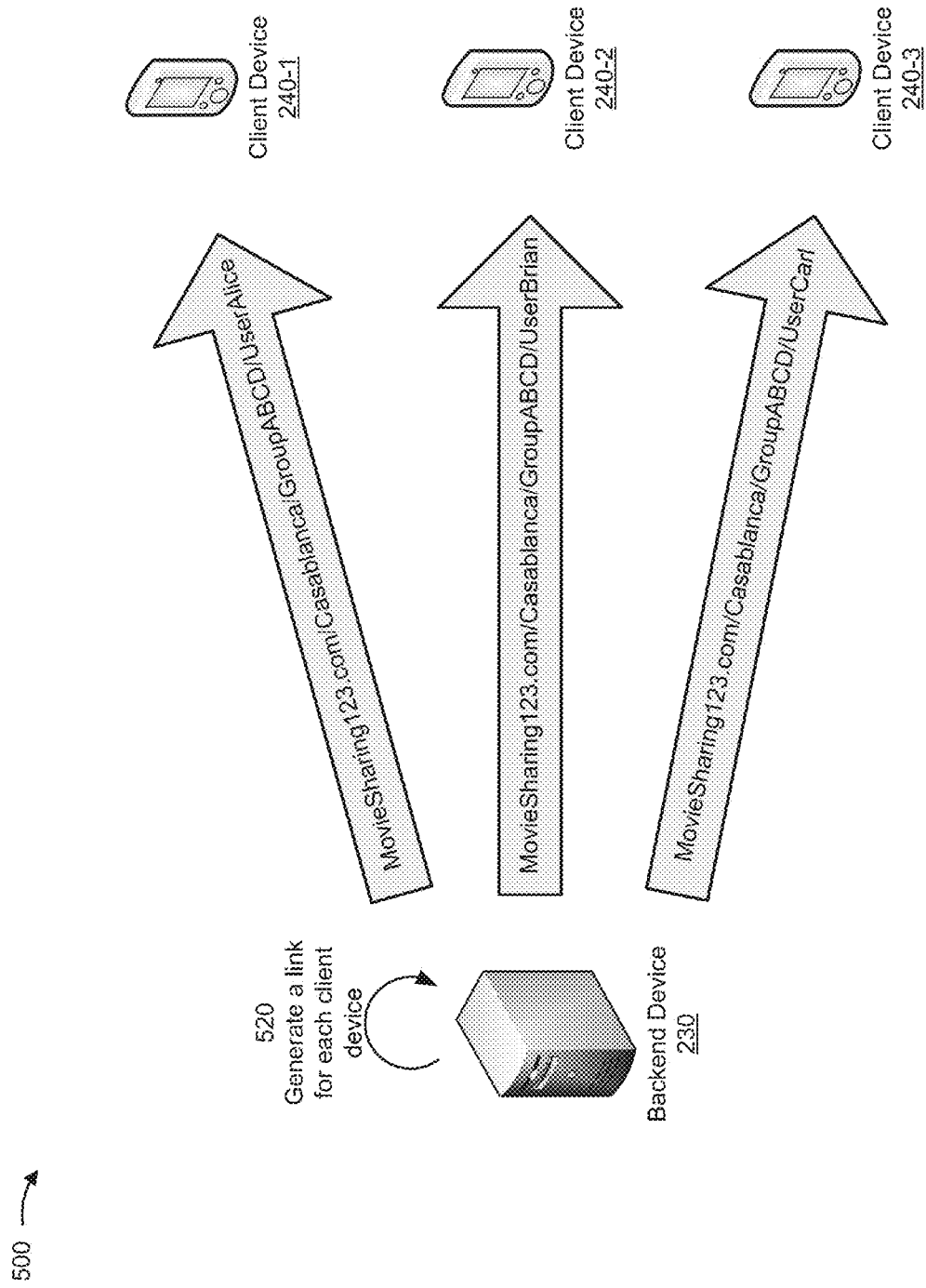

As shown in FIG. 5B, and by reference number 520, backend device 230 generates links associated with the social media watching environment for a set of client devices 240. Assume that client device 240-1 is associated with user Alice, client device 240-2 is associated with user Brian, and client device 240-3 is associated with user Carl. Each link is a deep-link identifying the content (e.g., "/Casablanca"), a group identification assigned to the social media watching environment (e.g., "/GroupABCD"), and the particular user to whom the link is to be provided (e.g., "/UserAlice," "/UserBrian," or "/UserCarl"). Assume that the links are provided by backend device 230 to client device 240-1, client device 240-2, and client device 240-3 via a set of emails.

Figure 5C:
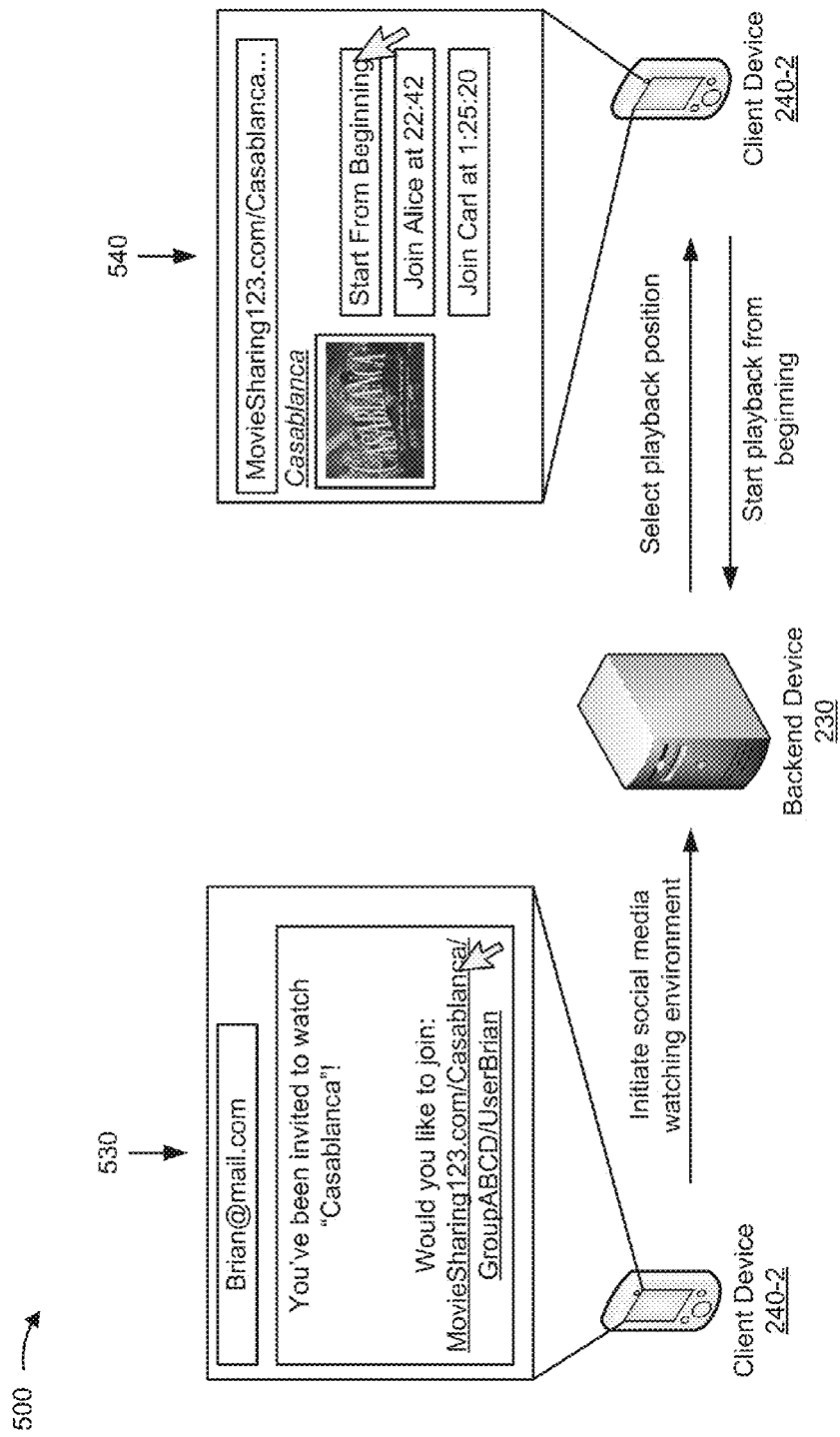

As shown in FIG. 5C, and by reference number 530, client device 240-2 is used by user Brian to access an email inviting user Brian to join the social media watching environment. Based on user interaction with the link, client device 240-2 sends a request to backend device 230 to be provided with the social media watching environment. As shown by reference number 540, backend device 230 provides a web page that is displayed by client device 240-2. The web page displays an option of multiple playback positions at which to start playback when the social media watching environment is loaded. For example, user Brian may select to start playback at the beginning, at a playback position shared with user Alice (e.g., "Join Alice at 22:42"), or at a playback position shared with user Carl (e.g., "Join Carl at 1:25:20"). Based on interaction with a button, client device 240-2 indicates that the movie is to be started at the beginning when the social media watching environment is provided.

Figure 5D:
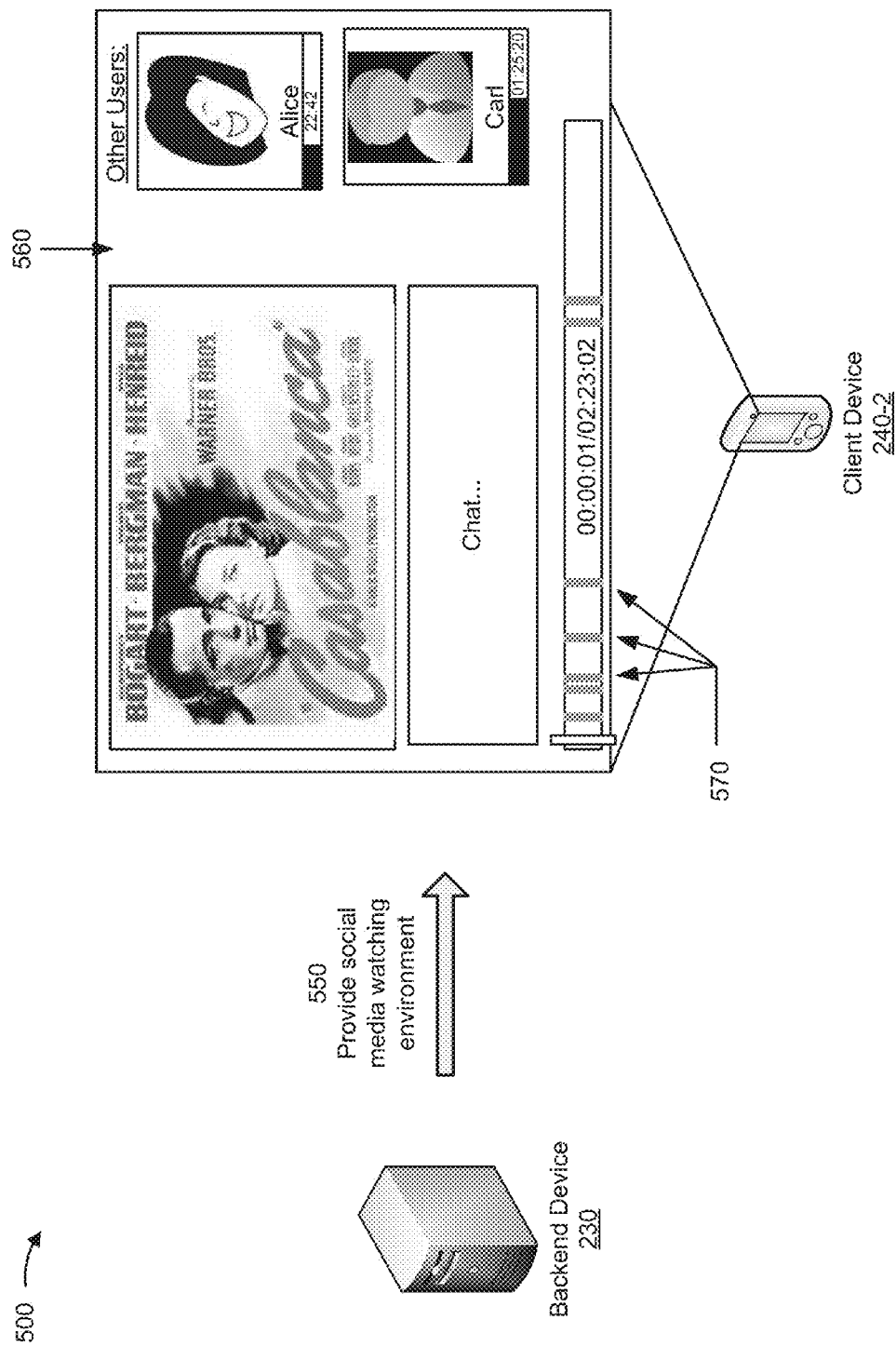

As shown in FIG. 5D, and by reference number 550, backend device 230 provides the social media watching environment to client device 240-2. As shown by reference number 560, the social media watching environment is displayed by client device 240-2. The social media watching environment provides the movie from the beginning, and provides information identifying other users of the social media watching environment (e.g., Alice and Carl). The information identifying the other users of the social media watching environment includes a playback position indicator for each user. In another example, based on user interaction with the playback position indicator for user Alice, client device 240-2 may indicate to backend device 230 that playback is to be skipped to the playback position associated with user Alice (e.g., "22:42"). As shown by reference number 570, the social media watching environment includes tags (e.g., shown by a set of "bars") indicating comments made by users of the social media watching environment (e.g., Alice, Brian, and/or Carl). In another example, the social media watching environment may display a comment associated with a tag when the playback position reaches a timestamp associated with the tag.

As indicated above, FIGS. 5A-5D are provided merely as an example. Other examples are possible and may differ from what was described with regard to FIGS. 5A-5D.

Figure 6:
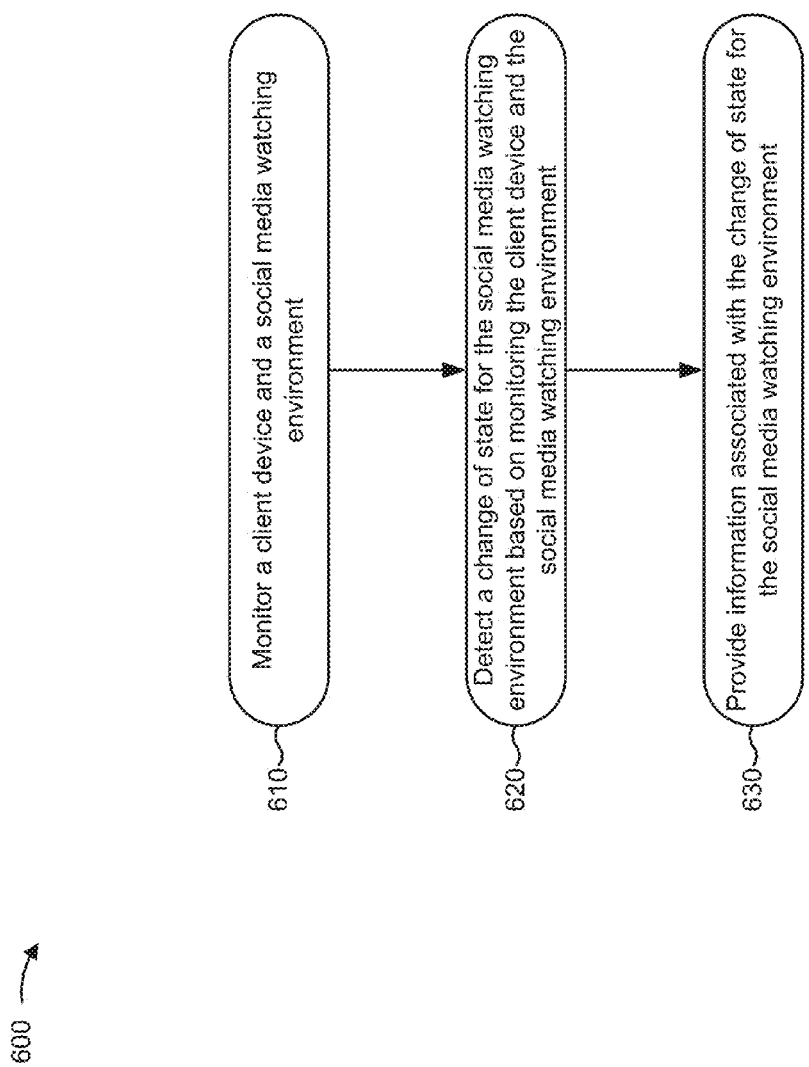
FIG. 6 is a flow chart of an example process for monitoring and updating a social media watching environment.

FIG. 6 is a flow chart of an example process for monitoring and updating a social media watching environment. In some implementations, one or more process blocks of FIG. 6 may be performed by backend device 230. Additionally, or alternatively, one or more process blocks of FIG. 6 may be performed by another device or a group of devices separate from or including backend device 230, such as host device 210 and/or client device 240.

As shown in FIG. 6, process 600 may include monitoring a client device and a social media watching environment (block 610). For example, backend device 230 may monitor interactions between a user of client device 240 and the social media watching environment. In some implementations, backend device 230 may remotely monitor interactions with the social media watching environment. For example, backend device 230 may determine a state associated with the social media watching environment. A state may refer to a playback condition (e.g., a playback position, a playback function, such as playing, pausing, or the like, a skip-to function, etc.), a social interaction condition (e.g., a messaging functionality usage, a messaging functionality display, etc.), or the like. Additionally, or alternatively, backend device 230 may monitor interactions with the social media watching environment based on receiving information from client device 240. For example, backend device 230 may receive a notification from client device 240 indicating a state associated with the social media watching environment.

As further shown in FIG. 6, process 600 may include detecting a change of state for the social media watching environment based on monitoring the client device and the social media watching environment (block 620). For example, backend device 230 may detect the change of state associated with the social media watching environment based on an interaction by a user of client device 240 with the social media watching environment. In some implementations, backend device 230 may receive a notification of the change of state from client device 240.

The change of state associated with the social media watching environment may include a playback adjustment, in some implementations. For example, a user of client device 240 may adjust the playback of the content being provided via the social media watching environment by starting playback, stopping playback, moving to a different playback position, selecting content, or the like. Additionally, or alternatively, the change of state associated with the social media watching environment may include a social interaction. For example, a user of a first client device 240 may compose a message associated with the content for a user of a second client device 240, such as by a typed message, a visual message (e.g., an image, a video, etc.), an audio message (e.g., a voice recording, a sound clip, etc.), or the like.

As further shown in FIG. 6, process 600 may include providing information associated with the change of state for the social media watching environment (block 630). For example, backend device 230 may provide information identifying the change of state associated with an interaction between a user of client device 240 and the social media watching environment. In this case, backend device 230 may provide information associated with the change of state for the social media watching environment to another client device 240 that is accessing the social media watching environment.

Backend device 230 may adjust playback for client device 240 when providing information associated with the change of state, in some implementations. For example, a user of a first client device 240 may pause playback via an interaction with the social media watching environment. In this case, backend device 230 may pause playback for a second client device 240 that is utilizing the social media watching environment. Additionally, or alternatively, backend device 230 may provide an indication that first client device 240 has paused playback.

Backend device 230 may provide a message between client devices 240 when providing information associated with the change of state, in some implementations. For example, a user of first client device 240 may determine to send a message based on an interaction with the social media watching environment. In this case, backend device 230 may provide the message to second client device 240 for display via the social media watching environment. Additionally, or alternatively, backend device 230 may delay providing the message. For example, when first client device 240 is at a particular playback position that is ahead of second client device 240, backend device 230 may delay providing the message to second client device 240 until second client device 240 reaches the particular playback position. Additionally, or alternatively, backend device 230 may associate the particular playback position with the message, and may provide an indication of the association to client device 240.

In this way, a backend device may facilitate social interaction between multiple users during content playback via a social media watching environment.

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
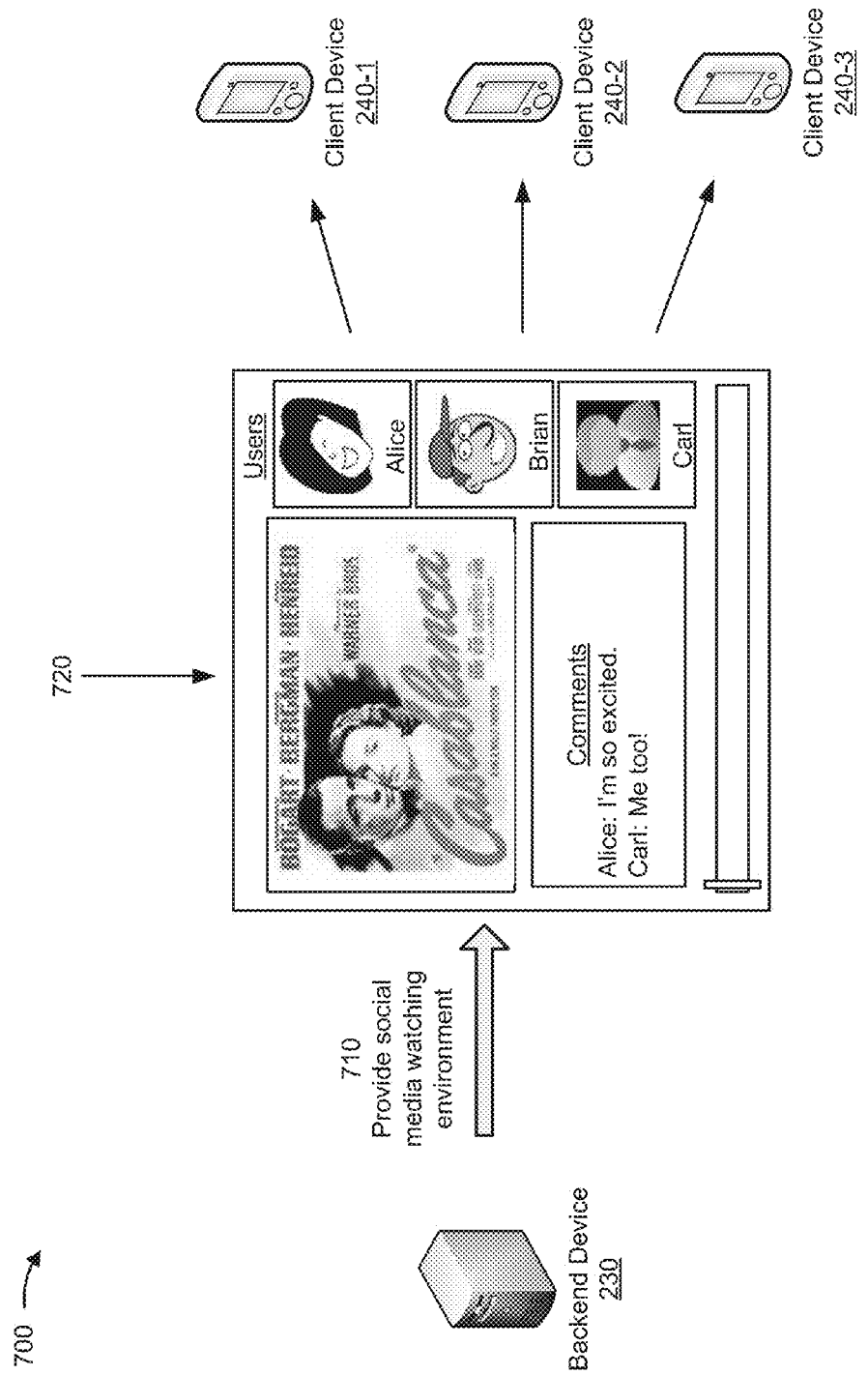
FIGS. 7A and 7B are diagrams of an example implementation relating to the example process shown in FIG. 6.
Figure 7B:
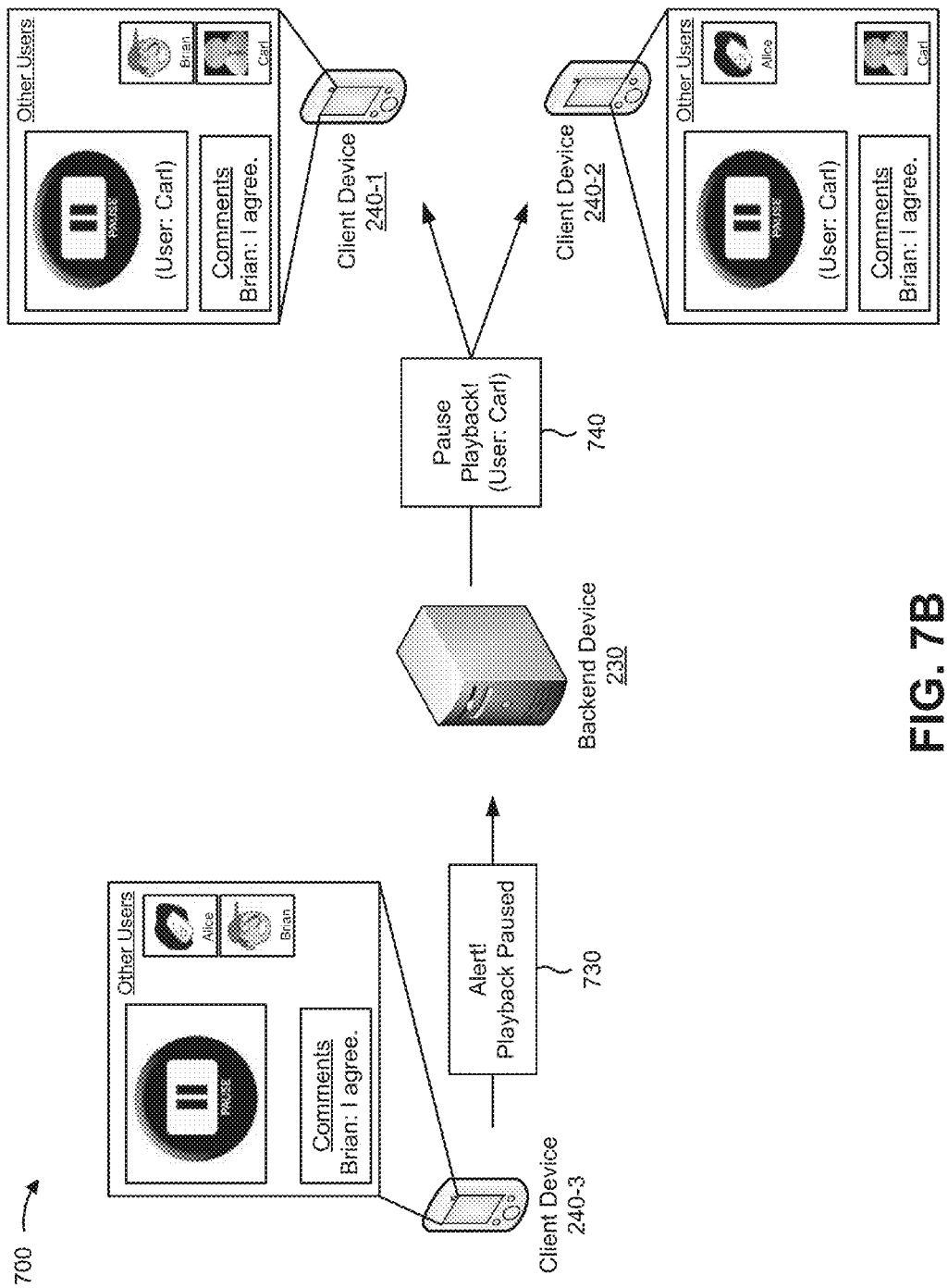

FIGS. 7A and 7B are diagrams of an example implementation 700 relating to process 600 shown in FIG. 6. As shown in FIG. 7A, example implementation 700 may include backend device 230, client device 240-1, client device 240-2, and client device 240-3. Assume that client device 240-1 is associated with a first user (e.g., "Alice"), client device 240-2 is associated with a second user (e.g., "Brian"), and client device 240-3 is associated with a third user (e.g., "Carl"). As shown by reference number 710, backend device 230 provides a social media watching environment to client device 240-1, client device 240-2, and client device 240-3. As shown by reference number 720, the social media watching environment includes content to be viewed (e.g., a movie, "Casablanca"), a chat module, and information identifying users who have been provided the social media watching environment (e.g., Alice, Brian, and Carl).

As shown in FIG. 7B, assume that user Carl pauses playback of content based on interaction with the social media watching environment using client device 240-3. As shown by reference number 730, client device 240-3 provides an indication to backend device 230 that playback has been paused. Backend device 230 detects a change of state for the social media watching environment (e.g., the playback being paused), and as shown by reference number 740, backend device 230 instructs client device 240-1 and client device 240-2 to pause playback.

As indicated above, FIGS. 7A and 7B are provided merely as an example. Other examples are possible and may differ from what was described with respect to FIGS. 7A and 7B.

Figure 8A:
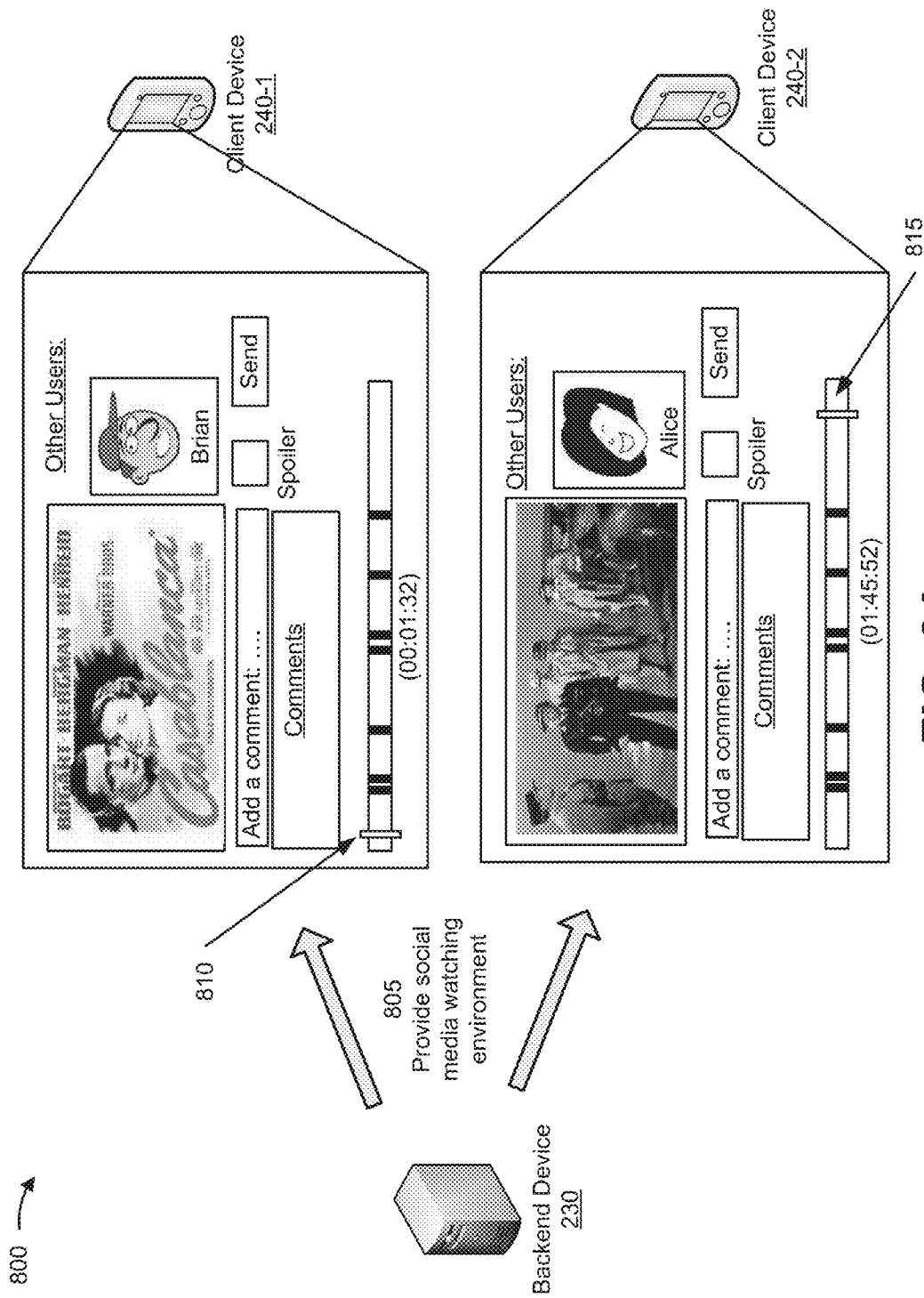

FIGS. 8A-8E are diagrams of another example implementation 800 relating to process 600 shown in FIG. 6. As shown in FIG. 8A, example implementation 800 includes backend device 230, client device 240-1, and client device 240-2. Assume that client device 240-1 is associated with a first user (e.g., "Alice"), and that client device 240-2 is associated with a second user (e.g., "Brian"). Assume that client device 240-1 and client device 240-2 have connected to the same social media watching environment, but are being provided content by backend device 230 at different playback positions. As shown by reference number 805, backend device 230 provides the social media watching environment for viewing content (e.g., a movie, "Casablanca") to client device 240-1 and client device 240-2. As shown by reference number 810, a playback position bar for client device 240-1 indicates that client device 240-1 is playing the content from a first playback position (e.g., "00:01:32"). As shown by reference number 815, a playback position bar for client device 240-2 indicates that client device 240-2 is playing the content from a second playback position (e.g., "01:45:52").

Figure 8B:
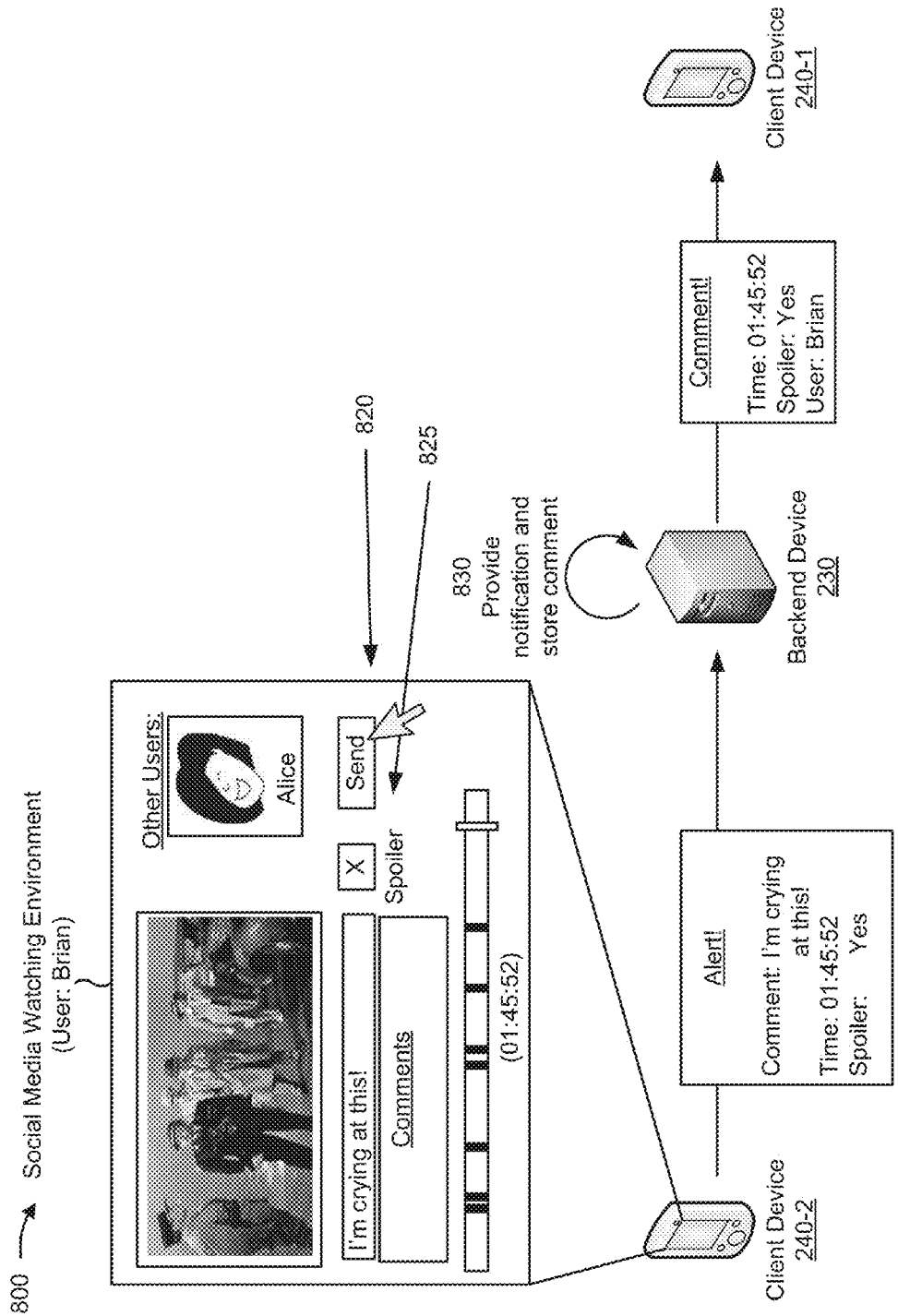

As shown in FIG. 8B, and by reference number 820, user Brian composes a comment that is to be provided via the social media watching environment (e.g., to the other user, Alice). As shown by reference number 825, user Brian has indicated that the comment is a "spoiler" (e.g., is to be associated with a particular timestamp to avoid informing another user about the comment before the other user has been provided the content occurring at the particular timestamp). As a result, user Brian can control whether the comment is provided immediately (e.g., spoiler is not selected) or at a particular position during playback (e.g., spoiler is selected).

Based on user interaction with a "SEND" button, client device 240-2 alerts backend device 230 of a change of state associated with the social media watching environment. The alert associated with the change of state identifies the comment, indicates that the comment is a spoiler, and identifies the timestamp associated with the comment (e.g., "01:45:52"). Backend device 230 receives the alert from client device 240-2, and as shown by reference number 830, provides information associated with the comment to client device 240-1 (e.g., by providing the timestamp for the comment, indicating that the comment is a spoiler, and identifying the sender of the comment).

Figure 8C:
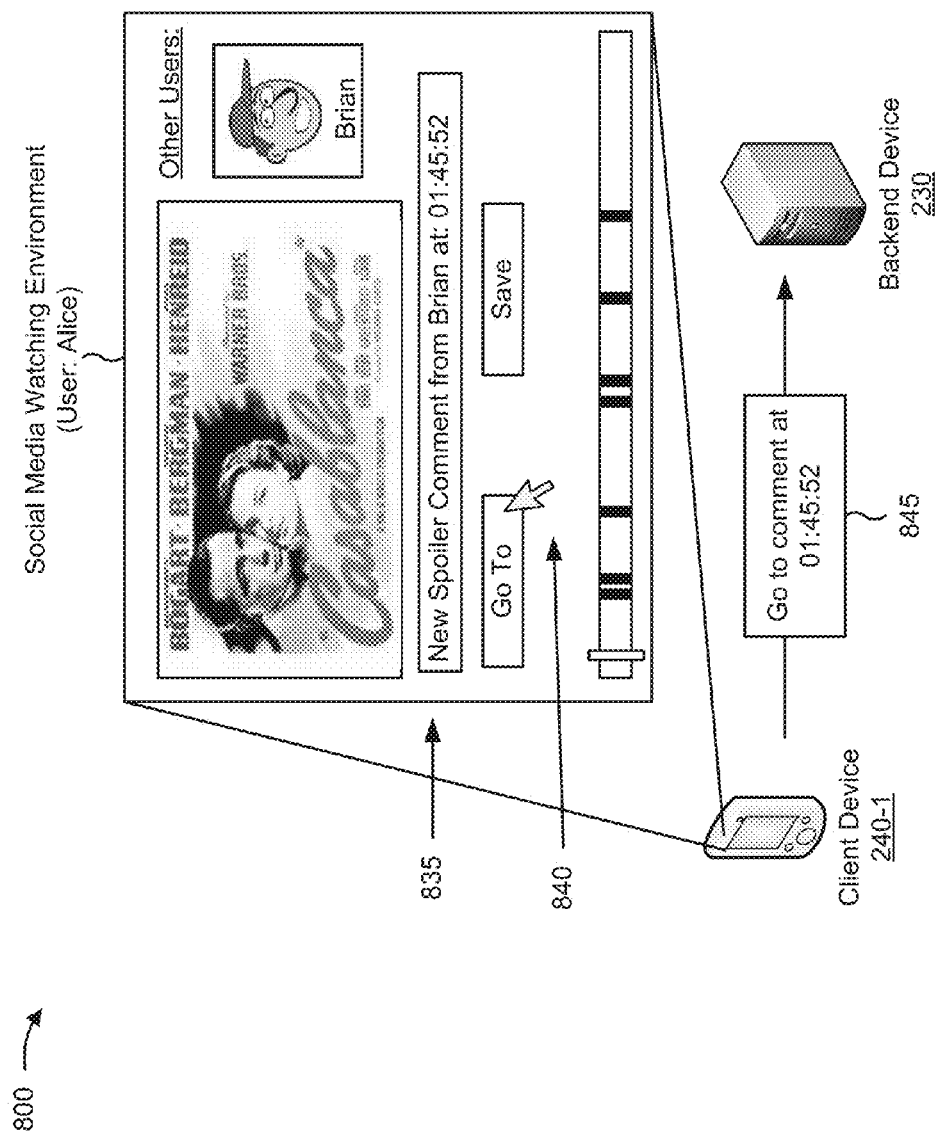

As shown in FIG. 8C, and by reference number 835, client device 240-1 displays, via the social media watching environment, an indication of the comment from user Brian. Client device 240-1 provides, via the social media watching environment, an option to adjust playback position to the timestamp associated with the comment or to save the comment until the timestamp is reached. Based on user interaction with a "Go To" button, as shown by reference number 840, client device 240-1 indicates to backend device 230 that the playback position is to be adjusted and the comment is to be provided, as shown by reference number 845.

Figure 8D:
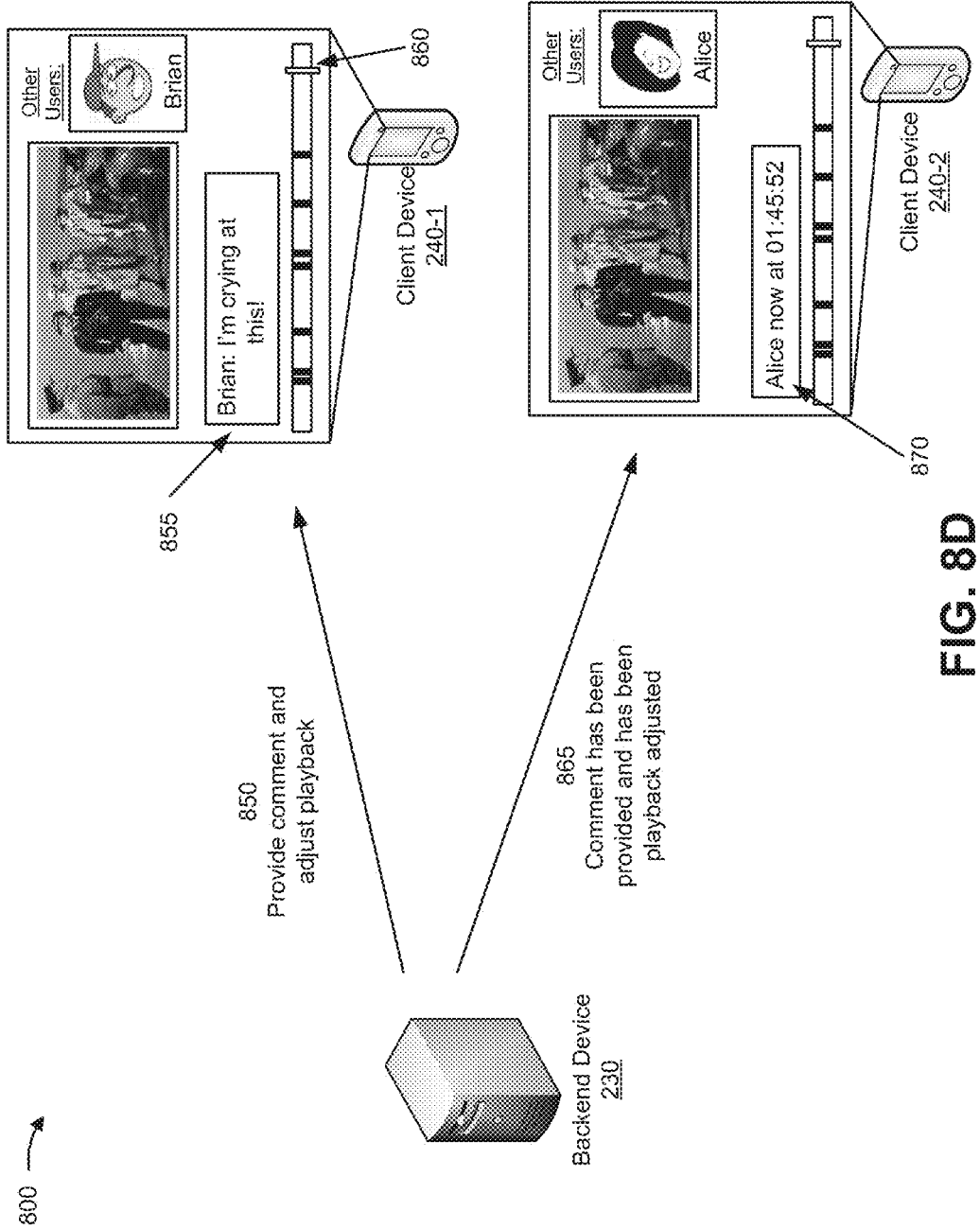

As shown in FIG. 8D, and by reference number 850, backend device 230 provides the comment and adjusts the playback position to the timestamp associated with the comment. As shown by reference number 855, the comment from user Brian is displayed (e.g., "I'm crying at this!"). As shown by reference number 860, the playback position bar has been adjusted to the timestamp associated with the comment. As shown by reference number 865, backend device 230 notifies client device 240-2 that the comment has been provided to, and the playback position has been adjusted for, client device 240-1. As shown by reference number 870, client device 240-2 provides an indication that user Alice selected to adjust the playback position to the timestamp associated with the comment (e.g., "Alice now at 01:45:52").

In another example, as shown in FIG. 8E, assume that user Alice had selected to save the comment until the timestamp was reached during playback. As shown by reference number 875, backend device 230 updates the social media watching environment with a new comment tag based on the comment from user Brian. As shown by reference number 880, the social media watching environment confirms that the comment has been saved. As shown by reference number 885, a tag has been added to the playback position bar, at the timestamp associated with the comment, indicating the comment. As shown by reference number 890, backend device 230 provides an indication to client device 240-2 that the comment has been saved. As shown by reference number 895, client device 240-2 displays the indication that the comment has been saved (e.g., "Alice saved the comment").

As indicated above, FIGS. 8A-8E are provided merely as an example. Other examples are possible and may differ from what was described with respect to FIGS. 8A-8E.

Implementations described herein may assist a backend device in generating a link for a social media watching environment, distributing the link to a client device, and/or providing the social media watching environment to the client device based on the client device utilizing the link. Furthermore, the backend device may monitor interactions between the client device and the social media watching environment to detect a change of state, and may provide information associated with the change of state to other client devices utilizing the social media watching environment.

As indicated above, while systems and methods may be described herein in terms of a social media watching environment, the systems and methods may also be implemented in terms of a social media listening environment. For example, a backend device may provide a movie, a television program, a concert, an audiobook, an album, a podcast, a lecture, etc. via the social media listening environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive, from a first client device, a request to join a social media environment in which a second client device is participating;
provide, to the first client device and based on the request to join, information regarding media content associated with the social media environment and a plurality of playback positions from which to begin playback of the media content,
one of the plurality of playback positions corresponding to a playback position of the second client device;
receive, from the first client device, information selecting a playback position, as a selected playback position of the plurality of playback positions, for the media content;
provide, to the first client device, the media content via the social media environment beginning at the selected playback position,
the media content being provided for display by the first client device;
monitor interactions with the social media environment by the first client device and the second client device;
detect a change of state for the social media environment based on monitoring the interactions with the social media environment,
the change of state being caused by the first client device; and
provide, to the second client device, information associated with the change of state based on detecting the change of state for the social media environment,
the information associated with the change of state including a spoiler communication from the first client device,
providing of the spoiler communication being delayed until the second client device reaches a particular playback position.

2. The device of claim 1, where the one or more processors are further to:
detect a playback configuration adjustment, for the social media environment, made by the first client device; and
provide, to the second client device, information identifying the playback configuration adjustment.

3. The device of claim 1, where the one or more processors are further to:
detect a playback configuration adjustment for playback at the first client device via the social media environment; and
cause playback, at the second client device, to be adjusted via the social media environment and based on the playback configuration adjustment.

4. The device of claim 1, where the one or more processors, when detecting the change of state for the social media environment, are to:
detect the spoiler communication via the social media environment; and
where the one or more processors, when providing the information associated with the change of state, are to:
provide the spoiler communication to the second client device via the social media environment.

5. The device of claim 1, where the one or more processors, when detecting the change of state for the social media environment, are to:
detect the spoiler communication via the social media environment; and
where the one or more processors are further to:
determine a timestamp, associated with the spoiler communication, at the first client device; and
cause the spoiler communication to be provided for playback at the second client device when the particular playback position matches the timestamp.

6. The device of claim 1, where the one or more processors are further to:
receive information identifying a state associated with the social media environment; and
determine that the received information identifying the state associated with the social media environment is different from stored state information associated with the social media environment; and
where the one or more processors, when detecting the change of state for the social media environment, are to:
detect the change of state for the social media environment based on determining that the received information identifying the state associated with the social media environment is different from the stored state information associated with the social media environment.

7. The device of claim 1, where the particular playback position is a first particular playback position; and
where the one or more processors are further to:
identify a second particular playback position associated with a third client device participating in the social media environment;

provide information identifying the second particular playback position to the second client device; and cause the playback position of the second client device to be adjusted to the second particular playback position based on providing the information identifying the second particular playback position to the second client device.

8. A non-transitory computer-readable medium storing instructions, the instructions comprising:
one or more instructions that, when executed by one or more processors, cause the one or more processors to:
receive, from a first client device, a request to initiate a social media environment;
generate a link for the social media environment based on receiving the request to initiate the social media environment;
provide, to a second client device, the link for the social media environment;
receive, from the second client device, a request to join the social media environment based on providing the link for the social media environment;
determine a playback position, of the first client device, for content playback via the social media environment based on receiving the request to join the social media environment;
provide, to the second client device, information regarding a plurality of playback positions from which to begin playback of the content,
one of the plurality of playback positions corresponding to the playback position of the first client device;
receive, from the second client device, information selecting a playback position, as a selected playback position of the plurality of playback positions, for the content;
provide, to the second client device, content playback at the selected playback position via the social media environment,
the content playback being provided for display by the second client device at the selected playback position; and
provide, to the second client device, information associated with a change of state,
the information associated with the change of state including with a communication from the first client device,
the communication including a spoiler, and
providing of the communication to be delayed until the second client device reaches a particular playback position.

9. The non-transitory computer-readable medium of claim 8, where the one or more instructions, when executed by the one or more processors, further cause the one or more processors to:
receive information identifying the content associated with the social media environment; and
where the one or more instructions, that cause the one or more processors to generate the link for the social media environment, cause the one or more processors to:
generate the link for the social media environment to include at least a portion of the information identifying the content.

10. The non-transitory computer-readable medium of claim 8, where the one or more instructions, when executed by the one or more processors, further cause the one or more processors to:

determine a group identifier associated with the social media environment; and
where the one or more instructions, that cause the one or more processors to generate the link for the social media environment, cause the one or more processors to:
generate the link for the social media environment to include at least a portion of the group identifier associated with the social media environment.

11. The non-transitory computer-readable medium of claim 8, where the one or more instructions, when executed by the one or more processors, further cause the one or more processors to:
determine an identifier associated with the second client device; and
where the one or more instructions, that cause the one or more processors to generate the link for the social media environment, cause the one or more processors to:
generate the link for the social media environment to include at least a portion of the identifier associated with the second client device.

12. The non-transitory computer-readable medium of claim 8, where the one or more instructions, when executed by the one or more processors, further cause the one or more processors to:
detect the communication via the social media environment;
determine a timestamp, associated with the communication, for playback; and
cause the communication to be provided for playback at the second client device when the particular playback position matches the timestamp.

13. The non-transitory computer-readable medium of claim 8, where the one or more instructions, when executed by the one or more processors, cause the one or more processors to:
receive information identifying a social networking service; and
where the one or more instructions, that cause the one or more processors to provide the link for the social media environment, cause the one or more processors to:
provide the link for the social media environment via the social networking service.

14. The non-transitory computer-readable medium of claim 8, where the one or more instructions, when executed by the one or more processors, cause the one or more processors to:
detect the communication via the social media environment; and
provide the communication to the second client device via the social media environment.

15. A method, comprising:
receiving, by a device and from a first client device, a request to initiate a social media environment for providing content;
generating, by the device and based on receiving the request to initiate the social media environment, a link for the social media environment;
providing, by the device and to a second client device, the link for the social media environment;
receiving, by the device and from the second client device, a request to join the social media environment based on providing the link for the social media environment;
determining, by the device, a playback position of the content at the first client device;

providing, by the device and to the second client device,
information regarding a plurality of playback positions
from which to begin playback of the content,
one of the plurality of playback positions corresponding to the playback position of the first client device;
causing, by the device, the second client device to begin playback of the content, at a selected one of the plurality of playback positions, via the social media environment,
the causing of the second client device to begin playback of the content, at the selected one of the plurality of playback positions, causing the content at the selected one of the plurality of playback positions to be displayed;
monitoring, by the device, the social media environment;
detecting, by the device, a change of state associated with the social media environment based on monitoring the social media environment,
the change of state being caused by the first client device; and
providing, by the device, information associated with the change of state to the second client device,
the information associated with the change of state including a communication from the first client device,
providing of the communication to be delayed until the second client device reaches a particular playback position.

16. The method of claim 15, further comprising:
receiving information indicating that the first client device intends to synchronize playback with the second client device; and
providing synchronized playback to the first client device; and
providing information, to the second client device and via the social media environment, indicating that synchronized playback is being provided to the first client device.

17. The method of claim 15, further comprising:
determining descriptive information associated with the content; and
embedding the descriptive information associated with the content in the link for the social media environment.

18. The method of claim 15, further comprising:
providing information identifying a set of audio or visual programs; and
where receiving the request to initiate the social media environment comprises:
receiving information selecting a program from the set of audio or visual programs.

19. The method of claim 15, further comprising:
determining that the communication is composed at the first client device,
the first client device utilizing the social media environment at the particular playback position when the communication is composed at the first client; and
where providing information associated with the change of state comprises:
providing, to the second client device, the communication when the second client device reaches the particular playback position.

20. The method of claim 15, further comprising:
determining that the first client device has paused playback; and
providing an indication, to the second client device, that playback of the content is to be paused.

* * * * *